(12) United States Patent
Sakaguchi (10) Patent No.: US 11,047,825 B2
(45) Date of Patent: Jun. 29, 2021

(54) CERAMIC HEATER, SENSOR ELEMENT, AND GAS SENSOR

(71) Applicant: NGK INSULATORS, LTD., Nagoya (JP)

(72) Inventor: Rui Sakaguchi, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 12 days.

(21) Appl. No.: 15/414,681

(22) Filed: Jan. 25, 2017

(65) Prior Publication Data

US 2017/0219514 A1 Aug. 3, 2017

(30) Foreign Application Priority Data

Jan. 29, 2016 (JP) .............................. JP2016-015631

(51) Int. Cl.
   *G01N 27/406* (2006.01)
   *H05B 3/00* (2006.01)
   *H05B 3/28* (2006.01)

(52) U.S. Cl.
   CPC ....... *G01N 27/4067* (2013.01); *H05B 3/0014* (2013.01); *H05B 3/283* (2013.01); *H05B 2203/003* (2013.01)

(58) Field of Classification Search
   CPC ........... G01N 27/4067; G01N 27/4077; G01N 27/41; G01N 27/4074–4077;

(Continued)

(56) References Cited

U.S. PATENT DOCUMENTS 4,639,305 A * 1/1987 Shibata .............. G01N 27/4071
                                                       204/408
4,883,947 A * 11/1989 Murase .............. G01N 27/4067
                                                       219/553

(Continued)

FOREIGN PATENT DOCUMENTS

JP          60-259951 A    12/1985
JP           3571494 B2     9/2004

OTHER PUBLICATIONS

Notice of Reasons for Refusal for the corresponding Japanese application No. 2016-015631, dated Oct. 1, 2019.

(Continued)

*Primary Examiner* — James Lin
*Assistant Examiner* — Vivian A Tran
(74) *Attorney, Agent, or Firm* — Global IP Counselors, LLP (57) ABSTRACT

A heater unit includes a heater 72 having first bend portions 95 (95a to 95d) and second bend portions 96 (96a to 96f). The first bend portions 95 are turns present in a maximum-temperature area (first area 90a) where the maximum temperature is reached during heating among areas 88 where the turns have a narrower pitch and having apexes facing each other in the short-length direction (left-right direction) of a ceramic substrate. The second bend portions 96 are turns present in areas 89 where the turns have a wider pitch and having apexes facing each other in the short-length direction. The distance X1 [mm] between the first bend portions 95 facing each other is larger than the distance X2 [mm] between the second bend portions 96 facing each other.

11 Claims, 3 Drawing Sheets

(58) Field of Classification Search
CPC ............ G01N 27/4075; G01N 27/419; G01N 27/4065; G01N 27/4076; G01N 33/0037; G01N 27/409; G01N 1/2247; G01N 27/406; G01N 27/407; H05B 3/0014; H05B 3/283; H05B 2203/003; H05B 3/026; H05B 3/26; H05B 3/265; H05B 3/28; F02D 41/1438
See application file for complete search history.

(56) References Cited

U.S. PATENT DOCUMENTS

| | | | | |
|---|---|---|---|---|
| 5,916,467 | A * | 6/1999 | Shimada | H05B 3/46 219/541 |
| 6,287,439 | B1 * | 9/2001 | Kato | G01N 27/407 204/408 |
| 6,861,939 | B1 * | 3/2005 | Bischof | G01N 27/4067 219/482 |
| 2002/0139671 | A1 * | 10/2002 | Kato | G01N 27/4067 204/431 |
| 2008/0017632 | A1 * | 1/2008 | Maki | H01L 21/67103 219/543 |

OTHER PUBLICATIONS

The Office Action for the corresponding German patent No. 10 2017 000 769.1 dated Dec. 2, 2020.

\* cited by examiner

Fig. 6

CERAMIC HEATER, SENSOR ELEMENT, AND GAS SENSOR

BACKGROUND OF THE INVENTION

1. Field of the Invention

The present invention relates to ceramic heaters, sensor elements, and gas sensors.

2. Description of the Related Art

There is a known ceramic heater for use in sensor elements that includes a plurality of oxygen-ion-conductive solid electrolyte ceramic layers and a heater held therebetween that generates heat when externally supplied with current (see, for example, PTL 1). The heater disclosed in PTL 1 has an area having a narrower pitch and an area having a wider pitch.

Figure 6:
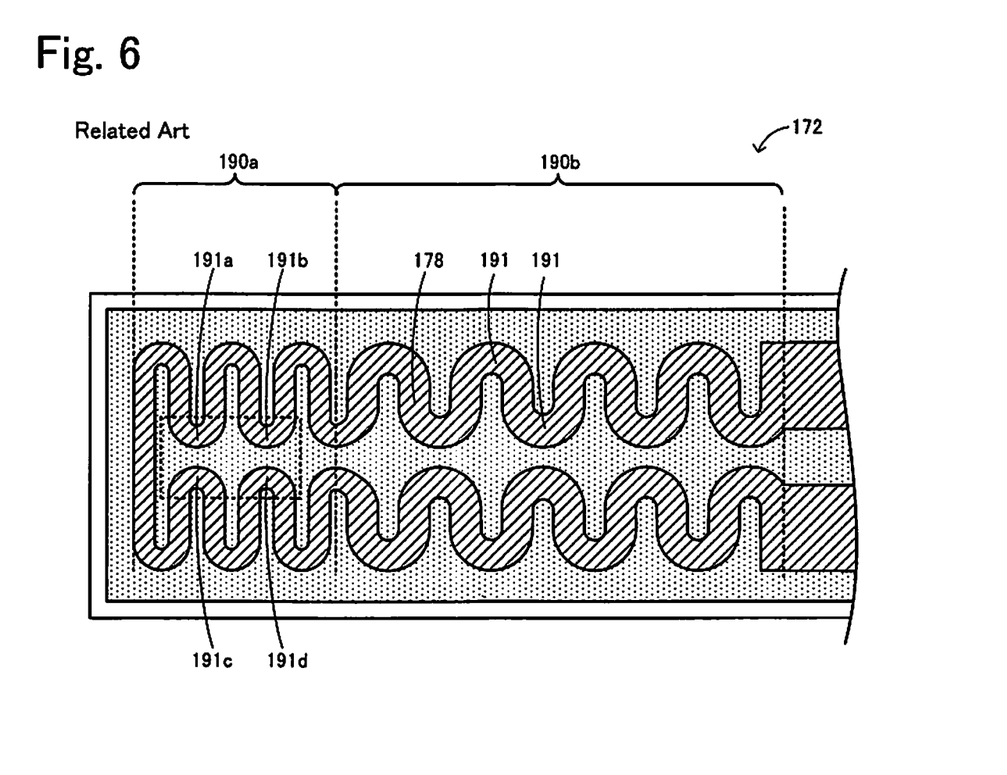
FIG. 6 is an illustration of an example known heater 172.

FIG. 6 is an illustration of an example known heater 172. The heater 172 has a plurality of straight segments 178 and a plurality of bend portions (turns) 191 where the heater 172 makes turns in the direction from top to bottom in FIG. 6. The heater 172 is routed such that the straight segments 178 and the bend portions 191 are alternately connected. The heater 172 is routed to make one turn as a whole in the direction from left to right in FIG. 6. The heater 172 has a first area 190a on the left in FIG. 6 where the turns have a narrower pitch and a second area 190b on the right in FIG. 6 where the turns have a wider pitch. This pattern allows the temperature of the heater 172 to be higher in the first area 190a, where the turns have a narrower pitch, than in the second area 190b and thus provides a temperature distribution suitable for the object to be heated.

CITATION LIST

Patent Literature

[PTL 1] Japanese Patent No. 3571494

SUMMARY OF THE INVENTION

Unfortunately, the heater 172 in FIG. 6 has a problem in that its temperature tends to be higher at the bend portions 191a to 191d present in the first area 190a, where the pitch is narrower, and facing each other than at other portions, for example, due to heat transfer between the bend portions 191a to 191d. Specifically, the heater 172 has a problem in that it tends to be locally heated at the bend portions 191a to 191d (in the area enclosed by the dashed line in FIG. 6) in the first area 190a, where the temperature is higher as a whole than in the second area 190b, where the pitch is wider. The conductor that forms the heating element may be broken when degraded, for example, by oxidation at high temperature; therefore, the heater has a problem in that it is readily broken when the heating element is locally heated and degraded faster at that portion than at other portions.

In view of the foregoing problem, a primary object of the present invention is to reduce localized heating in the maximum-temperature area of a heating element.

To achieve the foregoing primary object, the present invention employs the following solutions.

A ceramic heater of the present invention comprises:
a plate-like ceramic substrate having a longitudinal direction and a short-length direction; and
a heating element disposed in the ceramic substrate, the heating element being routed to make a plurality of turns in the short-length direction while making a turn as a whole in the longitudinal direction, the heating element having, in the longitudinal direction, one or more areas where the turns in the short-length direction have a narrower pitch and one or more areas where the turns in the short-length direction have a wider pitch, the heating element having first and second bend portions, the first bend portions being turns present in a maximum-temperature area where a maximum temperature is reached during heating among the one or more narrower-pitch areas and having apexes facing each other in the short-length direction, the second bend portions being turns present in the one or more wider-pitch areas and having apexes facing each other in the short-length direction, a distance X1 [mm] between the first bend portions facing each other being larger than a distance X2 [mm] between the second bend portions facing each other.

This ceramic heater includes a heating element having a plurality of first bend portions that are turns present in a maximum-temperature area where the maximum temperature is reached during heating among one or more areas where the turns have a narrower pitch and having apexes facing each other in the short-length direction of the ceramic substrate and a plurality of second bend portions that are turns present in one or more areas where the turns have a wider pitch and having apexes facing each other in the short-length direction. The distance X1 [mm] between the first bend portions facing each other is larger than the distance X2 [mm] between the second bend portions facing each other. The temperature in the maximum-temperature area tends to be locally higher at the first bend portions facing each other, for example, due to heat transfer between the first bend portions. However, since the distance X1 is larger than the distance X2 in the ceramic heater according to the present invention, the temperature at the first bend portions facing each other tends to be lower than otherwise due to reduced heat transfer between the first bend portions. This reduces localized heating in the maximum-temperature area among the narrower-pitch areas of the heating element.

In the ceramic heater according to the present invention, the ratio of the distance X1 to the distance X2, X1/X2, may be 4/3 (=1.33 . . . ) or more. This further reduces localized heating at the first bend portions. The ratio X1/X2 may be less than 10/3 (=3.33 . . . ).

In the ceramic heater according to the present invention, the distance X1 may be 0.4 mm or more. This further reduces localized heating at the first bend portions. The distance X1 may be less than 1.0 mm.

In the ceramic heater according to the present invention, the heating element may have a third bend present in the maximum-temperature area outwardly of the first bend portions in the short-length direction, and a unit resistance Ra1 [μΩ/mm] that is the resistance of the first bend portions per unit length may be lower than a unit resistance Ra3 [μΩ/mm] that is the resistance of the third bend portion per unit length at least one temperature in a temperature range from 700° C. to 900° C. This allows the heat density (amount of heat generated per unit length) to be lower at the first bend portions than at the third bend portion at least one temperature in a temperature range from 700° C. to 900° C. The temperature in the maximum-temperature area tends to be higher at the first bend portions than at the third bend portion since the first bend portions are located inwardly of the third bend portion in the ceramic substrate. By providing a unit resistance Ra1 lower than the unit resistance Ra3 in addition to a distance X1 larger than the distance X2, the increase in temperature at the first bend portions, where the temperature tends to be higher, can be further reduced, which further reduces localized heating in the maximum-temperature area of the heating element.

In this case, the first bend portions may have a larger area than the third bend portion in a cross-section perpendicular to a lengthwise direction. This allows a unit resistance Ra1 lower than the unit resistance Ra3 to be easily achieved. In this case, the heating element may be strip-shaped, and the first bend portions may be wider than the third bend portion.

A sensor element according to the present invention for detecting the concentration of a particular gas in an analyte gas includes the ceramic heater according to any of the above aspects. This sensor element, therefore, has the same advantages as the ceramic heater according to the present invention, including reduced localized heating in the maximum-temperature area of the heating element.

The sensor element according to the present invention may further include a multilayer structure of oxygen-ion-conductive solid electrolyte layers on the ceramic substrate in a thickness direction perpendicular to the longitudinal direction and the short-length direction and an inner pump electrode disposed on an inner periphery of the gas channel. The multilayer structure has therein a gas channel into which an analyte gas is externally introduced. The maximum-temperature area of the heating element at least partially overlaps an inner-pump-electrode projected area where the inner pump electrode is projected toward the heating element in the thickness direction. This allows the inner pump electrode and the surrounding solid electrolyte layers to be activated at a relatively high temperature by the maximum-temperature area of the heating element.

In this case, the sensor element according to the present invention may include an outer pump electrode disposed on the outer surface of the multilayer structure. The sensor element according to the present invention may include an inner measuring electrode disposed on the inner periphery of the gas channel downstream of the inner pump electrode in the flow direction of the analyte gas. The sensor element according to the present invention may include an outer measuring electrode disposed on the outer surface of the multilayer structure. The sensor element according to the present invention may include an inner auxiliary pump electrode disposed on the inner periphery of the gas channel downstream of the inner pump electrode and upstream of the inner measuring electrode in the flow direction of the analyte gas. The sensor element according to the present invention may include an outer auxiliary pump electrode disposed on the outer surface of the multilayer structure.

A gas sensor according to the present invention includes the sensor element according to any of the above aspects. This gas sensor, therefore, has the same advantages as the sensor element according to the present invention, including reduced localized heating in the maximum-temperature area of the heating element.

DETAILED DESCRIPTION OF THE INVENTION

Figure 1:
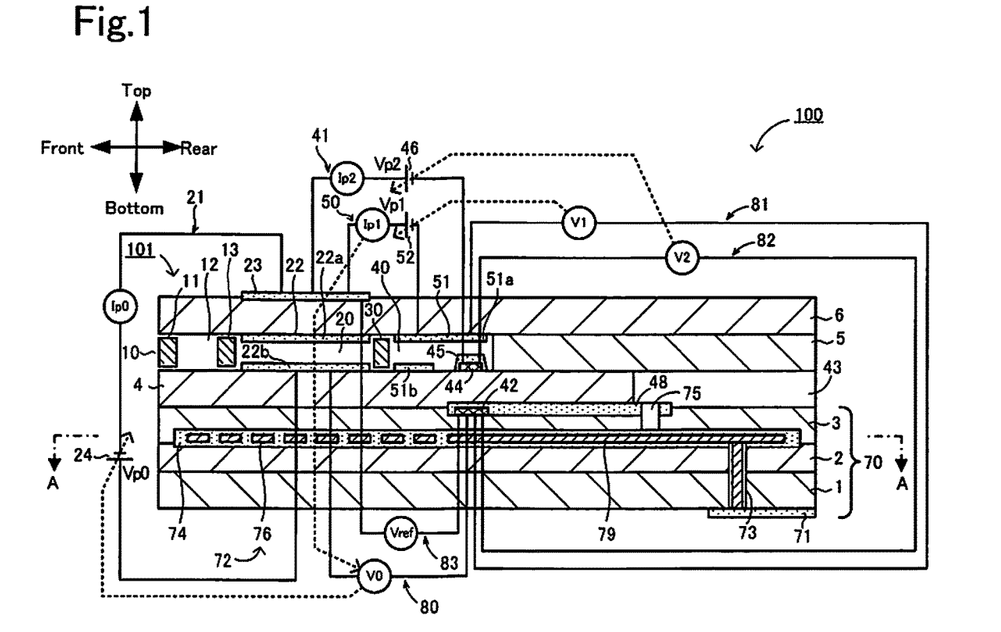
FIG. 1 is a schematic sectional view showing, in outline, an example gas sensor 100.
Figure 2:
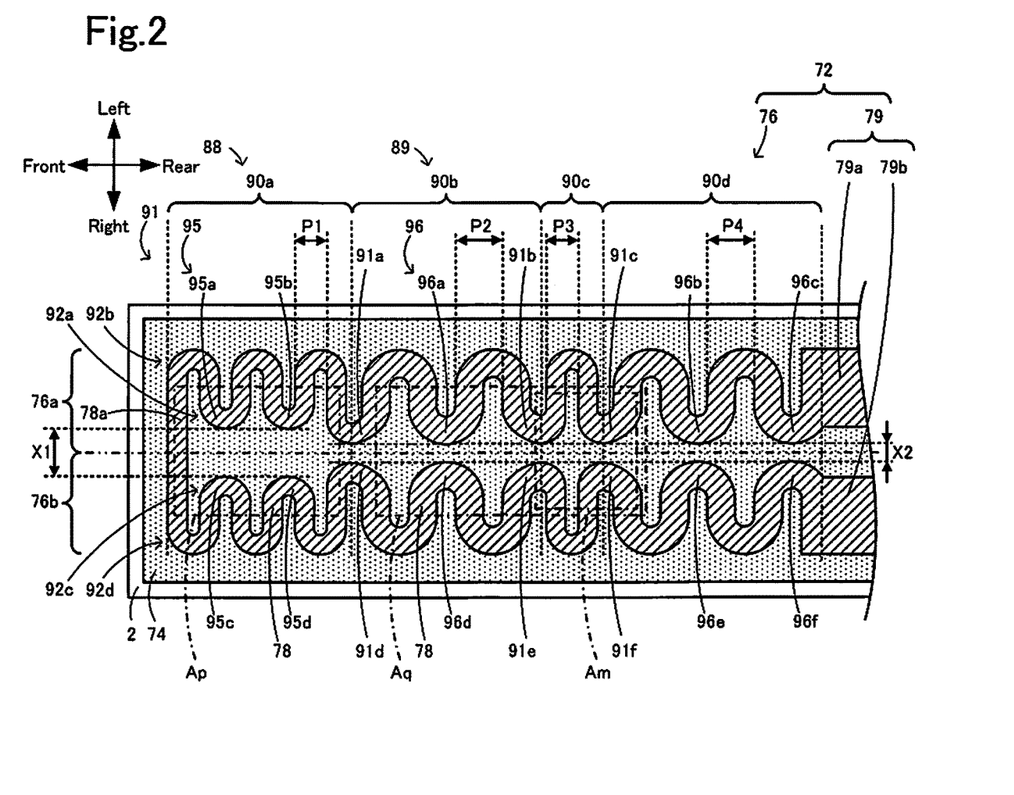
FIG. 2 is a sectional view taken along line A-A in FIG. 1.

Embodiments of the present invention will now be described with reference to the drawings. FIG. 1 is a schematic sectional view showing, in outline, an example gas sensor 100 according to an embodiment of the present invention. FIG. 2 is a sectional view taken along line A-A in FIG. 1. The gas sensor 100 includes a sensor element 101 for detecting the concentration of a particular gas in an analyte gas, such as $NO_x$ in automotive exhaust gas. The sensor element 101 is of an elongated cuboid shape. The longitudinal direction of the sensor element 101 (i.e., the direction from left to right in FIG. 1) is referred to as "front-rear direction", whereas the thickness direction of the sensor element 101 (i.e., the direction from top to bottom in FIG. 1) is referred to as "top-bottom direction". The width direction of the sensor element 101 (i.e., the direction perpendicular to the front-rear direction and the top-bottom direction) is referred to as "left-right direction".

The sensor element 101 includes a stacked structure of six layers of an oxygen-ion-conductive solid electrolyte such as zirconia ($ZrO_2$). These six layers are, in sequence from bottom to top as viewed in the figure, a first substrate layer 1, a second substrate layer 2, a third substrate layer 3, a first solid electrolyte layer 4, a spacer layer 5, and a second solid electrolyte layer 6. The solid electrolyte that forms these six layers is dense and gastight. The sensor element 101 is manufactured, for example, by subjecting ceramic green sheets for the individual layers to predetermined processing and circuit pattern printing before stacking and firing them to form a monolithic structure.

The sensor element 101 has, in sequence from one end thereof, a gas inlet 10, a first diffusion-limiting section 11, a buffer space 12, a second diffusion-limiting section 13, a first internal cavity 20, a third diffusion-limiting section 30, and a second internal cavity 40 that are defined adjacent to each other between the bottom surface of the second solid electrolyte layer 6 and the top surface of the first solid electrolyte layer 4 such that they communicate with each other.

The gas inlet 10, the buffer space 12, the first internal cavity 20, and the second internal cavity 40 are spaces provided in the sensor element 101 such that the spacer layer 5 is removed, each having a top defined by the bottom surface of the second solid electrolyte layer 6, a bottom defined by the top surface of the first solid electrolyte layer 4, and sides defined by the side surfaces of the spacer layer 5.

The first diffusion-limiting section 11, the second diffusion-limiting section 13, and the third diffusion-limiting section 30 are each provided as two elongated slits (with the longitudinal direction of the openings being perpendicular to the figure). The area from the gas inlet 10 to the second internal cavity 40 is also referred to as "gas channel".

A reference-gas introduction space 43 is provided between the top surface of the third substrate layer 3 and the bottom surface of the spacer layer 5 at a position farther away from the front end than the gas channel. The reference-gas introduction space 43 has sides defined by the side surfaces of the first solid electrolyte layer 4. For example, air is introduced into the reference-gas introduction space 43 as a reference gas for $NO_x$ concentration measurements.

An air introduction layer 48 is a porous ceramic layer into which the reference gas is introduced through the reference-gas introduction space 43. The air introduction layer 48 is formed to cover a reference electrode 42.

The reference electrode 42 is formed between the top surface of the third substrate layer 3 and the first solid electrolyte layer 4. As described above, the reference electrode 42 is covered by the air introduction layer 48, which leads to the reference-gas introduction space 43. As described later, the reference electrode 42 can be used to measure the oxygen concentration (oxygen partial pressure) in the first internal cavity 20 and the second internal cavity 40.

The gas inlet 10 of the gas channel is open to the external space so that the analyte gas can be taken from the external space into the sensor element 101 through the gas inlet 10. The first diffusion-limiting section 11 adds a predetermined resistance to the diffusion of the analyte gas taken through the gas inlet 10. The buffer space 12 is provided to direct the analyte gas introduced through the first diffusion-limiting section 11 into the second diffusion-limiting section 13. The second diffusion-limiting section 13 adds a predetermined resistance to the diffusion of the analyte gas introduced from the buffer space 12 into the first internal cavity 20. An analyte gas rapidly taken from outside the sensor element 101 into the sensor element 101 through the gas inlet 10 due to pressure variations in the external space (if the analyte gas is automotive exhaust gas, due to pulsations in exhaust pressure) is not directly introduced into the first internal cavity 20. Rather, the analyte gas is introduced into the first internal cavity 20 after concentration variations are removed from the analyte gas through the first diffusion-limiting section 11, the buffer space 12, and the second diffusion-limiting section 13. This results in almost negligible concentration variations in the analyte gas introduced into the first internal cavity 20. The first internal cavity 20 is provided as a space for adjusting the oxygen partial pressure of the analyte gas introduced through the second diffusion-limiting section 13. The oxygen partial pressure is adjusted by the operation of a main pump cell 21.

The main pump cell 21 is an electrochemical pump cell formed by an inner pump electrode 22 including a ceiling electrode portion 22a disposed substantially over the entire portion of the bottom surface of the second solid electrolyte layer 6 facing the first internal cavity 20, an outer pump electrode 23 disposed on the portion of the top surface of the second solid electrolyte layer 6 facing the ceiling electrode portion 22a and exposed in the external space, and the second solid electrolyte layer 6 disposed therebetween.

The inner pump electrode 22 is formed across the upper and lower solid electrolyte layers that define the first internal cavity 20 (second solid electrolyte layer 6 and first solid electrolyte layer 4) and the spacer layer 5, which forms the sidewalls of the first internal cavity 20. Specifically, the ceiling electrode portion 22a is formed on the bottom surface of the second solid electrolyte layer 6, which forms the ceiling surface of the first internal cavity 20, and a bottom electrode portion 22b is formed on the top surface of the first solid electrolyte layer 4, which forms the bottom surface of the first internal cavity 20. Side electrode portions (not shown) are formed on the sidewall surfaces (inner peripherys) of the spacer layer 5, which form both sidewalls of the first internal cavity 20, thereby connecting the ceiling electrode portion 22a and the bottom electrode portion 22b to each other. The inner pump electrode 22 is thus provided to form a tunnel-like configuration in the area where the side electrode portions are provided.

The inner pump electrode 22 and the outer pump electrode 23 are formed as porous cermet electrodes (e.g., Pt-ZrO$_2$ cermet electrodes containing 1% Au). The inner pump electrode 22, which contacts the analyte gas, is made of a material with lowered reduction activity on NO$_x$ components in the analyte gas.

The desired pump voltage Vp0 can be applied between the inner pump electrode 22 and the outer pump electrode 23 of the main pump cell 21 to allow a pump current Ip0 to flow between the inner pump electrode 22 and the outer pump electrode 23 in a positive or negative direction, thereby pumping oxygen from the first internal cavity 20 into the external space or from the external space into the first internal cavity 20.

The inner pump electrode 22, the second solid electrolyte layer 6, the spacer layer 5, the first solid electrolyte layer 4, the third substrate layer 3, and the reference electrode 42 form an electrochemical sensor cell for detecting the oxygen concentration (oxygen partial pressure) of the atmosphere in the first internal cavity 20, i.e., a main-pump-control oxygen-partial-pressure detecting sensor cell 80.

The oxygen concentration (oxygen partial pressure) in the first internal cavity 20 can be determined by measuring the electromotive force V0 of the main-pump-control oxygen-partial-pressure detecting sensor cell 80. A constant electromotive force V0 is maintained by controlling the pump current Ip0 through feedback control of the pump voltage Vp0 of a variable power supply 24. This allows a constant predetermined oxygen concentration to be maintained in the first internal cavity 20.

The third diffusion-limiting section 30 adds a predetermined resistance to the diffusion of the analyte gas whose oxygen concentration (oxygen partial pressure) has been controlled in the first internal cavity 20 by the operation of the main pump cell 21 and directs the analyte gas into the second internal cavity 40.

The second internal cavity 40 is provided as a space for performing treatment associated with the measurement of the nitrogen oxide (NO$_x$) concentration of the analyte gas introduced through the third diffusion-limiting section 30. The NO$_x$ concentration is mainly measured in the second internal cavity 40 by the operation of a measuring pump cell 41 after the oxygen concentration is adjusted by an auxiliary pump cell 50.

After the oxygen concentration (oxygen partial pressure) is adjusted in the first internal cavity 20 in advance, the analyte gas is introduced through the third diffusion-limiting section 30 into the second internal cavity 40, where the oxygen partial pressure is adjusted by the auxiliary pump cell 50. This allows a constant oxygen concentration to be accurately maintained in the second internal cavity 40 and thus allows for accurate NO$_x$ concentration measurements with the gas sensor 100.

The auxiliary pump cell 50 is an auxiliary electrochemical pump cell formed by an auxiliary pump electrode 51 including a ceiling electrode portion 51a disposed substantially over the entire portion of the bottom surface of the second solid electrolyte layer 6 facing the second internal cavity 40, the outer pump electrode 23 (which is optional and may be replaced with any suitable electrode disposed outside the sensor element 101), and the second solid electrolyte layer 6.

The auxiliary pump electrode 51 is provided in the second internal cavity 40 to form a tunnel-like configuration similar to the inner pump electrode 22 provided in the first internal cavity 20 described above. Specifically, the ceiling electrode portion 51a is formed on the second solid electrolyte layer 6, which forms the ceiling surface of the second internal cavity 40, and a bottom electrode portion 51b is formed on the first solid electrolyte layer 4, which forms the bottom surface of the second internal cavity 40. Side electrode portions (not shown) connecting the ceiling electrode portion 51a and the bottom electrode portion 51b to each other are formed on both wall surfaces of the spacer layer 5, which form the sidewalls of the second internal cavity 40, thereby forming a tunnel-like configuration. As with the inner pump electrode 22, the auxiliary pump electrode 51 is made of a material with lowered reduction activity on $NO_x$ components in the analyte gas.

The desired voltage Vp1 can be applied between the auxiliary pump electrode 51 and the outer pump electrode 23 of the auxiliary pump cell 50 to pump oxygen from the atmosphere in the second internal cavity 40 into the external space or from the external space into the second internal cavity 40.

The auxiliary pump electrode 51, the reference electrode 42, the second solid electrolyte layer 6, the spacer layer 5, the first solid electrolyte layer 4, and the third substrate layer 3 form an electrochemical sensor cell for controlling the oxygen partial pressure of the atmosphere in the second internal cavity 40, i.e., an auxiliary-pump-control oxygen-partial-pressure detecting sensor cell 81.

The auxiliary pump cell 50 performs pumping as it is powered by a variable power supply 52 whose voltage is controlled depending on the electromotive force V1 detected in the auxiliary-pump-control oxygen-partial-pressure detecting sensor cell 81. This allows the oxygen partial pressure in the atmosphere in the second internal cavity 40 to be controlled to a low level that does not substantially affect $NO_x$ measurements.

The pump current Ip1 is also used to control the electromotive force of the main-pump-control oxygen-partial-pressure detecting sensor cell 80. Specifically, the pump current Ip1 is input as a control signal to the main-pump-control oxygen-partial-pressure detecting sensor cell 80 to control the electromotive force V0 thereof so that the gradient of the oxygen partial pressure of the analyte gas introduced into the second internal cavity 40 through the third diffusion-limiting section 30 remains constant. When the gas sensor 100 serves as a $NO_x$ sensor, an oxygen concentration of about 0.001 ppm is maintained in the second internal cavity 40 by the operation of the main pump cell 21 and the auxiliary pump cell 50.

The measuring pump cell 41 measures the $NO_x$ concentration of the analyte gas in the second internal cavity 40. The measuring pump cell 41 is an electrochemical pump cell formed by a measuring electrode 44 disposed on the portion of the top surface of the first solid electrolyte layer 4 facing the second internal cavity 40 at a position away from the third diffusion-limiting section 30, the outer pump electrode 23, the second solid electrolyte layer 6, the spacer layer 5, and the first solid electrolyte layer 4.

The measuring electrode 44 is a porous cermet electrode. The measuring electrode 44 also functions as a $NO_x$ reduction catalyst that reduces $NO_x$ present in the atmosphere in the second internal cavity 40. The measuring electrode 44 is covered by a fourth diffusion-limiting section 45.

The fourth diffusion-limiting section 45 is a porous ceramic film. The fourth diffusion-limiting section 45 not only limits the amount of $NO_x$ flowing into the measuring electrode 44, but also functions as a protective film for the measuring electrode 44. The measuring pump cell 41 can pump oxygen generated by the decomposition of nitrogen oxides in the atmosphere around the measuring electrode 44 to detect the amount of oxygen generated as a pump current Ip2.

The first solid electrolyte layer 4, the third substrate layer 3, the measuring electrode 44, and the reference electrode 42 form an electrochemical sensor cell for detecting the oxygen partial pressure around the measuring electrode 44, i.e., a measuring-pump-control oxygen-partial-pressure detecting sensor cell 82. A variable power supply 46 is controlled depending on the electromotive force V2 detected in the measuring-pump-control oxygen-partial-pressure detecting sensor cell 82.

The analyte gas introduced into the second internal cavity 40 reaches the measuring electrode 44 through the fourth diffusion-limiting section 45 at a controlled oxygen partial pressure. The nitrogen oxides in the analyte gas around the measuring electrode 44 are reduced to generate oxygen ($2NO \rightarrow N_2 + O_2$). The resulting oxygen is pumped by the measuring pump cell 41. During this process, the voltage Vp2 of the variable power supply 46 is controlled so that the electromotive force V2 detected in the measuring-pump-control oxygen-partial-pressure detecting sensor cell 82 remains constant. Since the amount of oxygen generated around the measuring electrode 44 is proportional to the nitrogen oxide concentration of the analyte gas, the nitrogen oxide concentration of the analyte gas is calculated from the pump current Ip2 through the measuring pump cell 41.

If the measuring electrode 44, the first solid electrolyte layer 4, the third substrate layer 3, and the reference electrode 42 are combined together to form an electrochemical sensor cell serving as an oxygen-partial-pressure detecting unit, it is possible to detect the electromotive force depending on the difference between the amount of oxygen generated by the reduction of $NO_x$ components in the atmosphere around the measuring electrode 44 and the amount of oxygen present in reference air. This electromotive force can be used to determine the concentration of $NO_x$ components in the analyte gas.

The second solid electrolyte layer 6, the spacer layer 5, the first solid electrolyte layer 4, the third substrate layer 3, the outer pump electrode 23, and the reference electrode 42 form an electrochemical sensor cell 83. The electromotive force Vref obtained by the sensor cell 83 can be used to detect the oxygen partial pressure of the analyte gas outside the sensor.

In the thus-configured gas sensor 100, the main pump cell 21 and the auxiliary pump cell 50 are operated to supply an analyte gas whose oxygen partial pressure is maintained at a constant low level (i.e., a level that does not substantially affect $NO_x$ measurements) to the measuring pump cell 41. This allows the $NO_x$ concentration of the analyte gas to be determined based on a pump current Ip2 that flows substantially in proportion to the $NO_x$ concentration of the analyte gas as the measuring pump cell 41 pumps oxygen generated by the reduction of $NO_x$.

To enhance the oxygen ion conductivity of the solid electrolyte, the sensor element 101 further includes a heater unit 70 that functions as a temperature regulator for heating and maintaining the sensor element 101 at constant temperature. The heater unit 70 includes heater connector electrodes 71, a heater 72, through-holes 73, a heater insulating layer 74, and a pressure-diffusing hole 75. The heater unit 70 further includes the first substrate layer 1, the second substrate layer 2, and the third substrate layer 3, which form a plate-like ceramic substrate having a longitudinal direction (front-rear direction) and a short-length direction (left-right direction). The heater unit 70 is configured as a ceramic heater including the ceramic substrate (first to third substrate layers 1 to 3) and the heater 72 disposed in the ceramic substrate. As shown in FIG. 2, the heater 72 includes a heating section 76 and leads 79.

The heater connector electrodes 71 are formed on the bottom surface of the first substrate layer 1. The heater connector electrodes 71 can be connected to an external power supply to externally supply a current to the heater unit 70.

The heating section 76 of the heater 72 is an electrical resistor formed between the second substrate layer 2 and the third substrate layer 3. The leads 79 of the heater 72 are connected to the heater connector electrodes 71 via the through-holes 73. As a current is externally supplied through the heater connector electrodes 71, the heating section 76 generates heat, thereby heating and maintaining the solid electrolyte that forms the sensor element 101 at constant temperature.

The heating section 76 of the heater 72 is embedded under the entire area from the first internal cavity 20 to the second internal cavity 40 so that the temperature of the entire sensor element 101 can be adjusted to a temperature at which the solid electrolyte activates.

The heater insulating layer 74 is an insulating layer formed on the top and bottom surfaces of the heater 72 and made of an insulating material such as alumina. The heater insulating layer 74 is intended to provide electrical insulation between the second substrate layer 2 and the heater 72 and between the third substrate layer 3 and the heater 72.

The pressure-diffusing hole 75 is provided such that the heater insulation layer 74 communicates with the reference-gas introduction space 43 through the third substrate layer 3. The pressure-diffusing hole 75 is intended to alleviate an increase in internal pressure due to a temperature increase in the heater insulating layer 74.

The heating section 76 and leads 79 of the heater 72 will now be described in detail. As shown in FIG. 2, the heating section 76 is a resistance heating element having a continuous zigzag strip shape and connected at both ends to the leads 79. The heating section 76 has a plurality of (in this embodiment, 32) bend portions 91 and a plurality of (in this embodiment, 31) straight segments 78. The bend portions 91 and the straight segments 78 are electrically connected in series. The heating section 76 is symmetrical with respect to the central axis (two-dot chain line in FIG. 2) of the sensor element 101 in the left-right direction. The portion of the heating section 76 to the left of the central axis is referred to as "left heating section 76a", whereas the right portion symmetrical with the left heating section 76a is referred to as "right heating section 76b".

The left heating section 76a and the right heating section 76b are each routed to make a plurality of turns at the bend portions 91 in the left-right direction while making a turn as a whole in the front-rear direction. The left heating section 76a and the right heating section 76b are connected together by the frontmost straight segment 78a of the straight segments 78. Thus, the heating section 76 is routed to extend as a whole from rear to front and then make a turn rearward at the straight segment 78a (and the left outer bend portion 92b and right outer bend portion 92d connected thereto). That is, the heating section 76 is routed to make one turn as a whole in the longitudinal direction (front-rear direction).

The bend portions 91 are turns in the left-right direction (short-length direction). The bend portions 91 in the left heating section 76a that are located on the inner (right) side of the sensor element 101 in the left-right direction are referred to as "left inner bend portions 92a". The bend portions 91 in the left heating section 76a that are located on the outer (left) side of the sensor element 101 in the left-right direction are referred to as "left outer bend portions 92b". Similarly, the bend portions 91 in the right heating section 76b that are located on the inner (left) side of the sensor element 101 in the left-right direction are referred to as "right inner bend portions 92c", and the bend portions 91 in the right heating section 7Gb that are located on the outer (right) side of the sensor element 101 in the left-right direction are referred to as "right outer bend portions 92d". The heating section 76 includes eight left inner bend portions 92a, eight left outer bend portions 92b, eight right inner bend portions 92c, and eight right outer bend portions 92d. The left inner bend portions 92a and the right outer bend portions 92d are turns where the heating section 76 extends from left (one side in the short-length direction) to right (the other side in the short-length direction) and then makes a turn to the left. The left outer bend portions 92b and the right inner bend portions 92c are turns where the heating section 76 extends from right to left and then makes a turn to the right. The bend portions 91 have a curved, semicircular arc shape. Alternatively, the bend portions 91 may form a jagged line. The bend portions 91 and the straight segments 78 of the heating section 76 are alternately arranged and connected. That is, the bend portions 91 connect the straight segments 78 adjacent to each other in the front-rear direction. More specifically, the left inner bend portions 92a connect the right ends of the adjacent straight segments 78 of the left heating section 76a, whereas the left outer bend portions 92b connect the left ends of the adjacent straight segments 78 of the left heating section 76a. Similarly, the right inner bend portions 92c connect the left ends of the adjacent straight segments 78 of the right heating section 76b, whereas the right outer bend portions 92d connect the right ends of the adjacent straight segments 78 of the right heating section 76b. The rearmost bend portion 91 (second bend portion 96c, described later) of the bend portions 91 in the left heating section 76a is connected at the rear end thereof to the first lead 79a. The rearmost bend portion 91 (second bend portion 96f, described later) of the bend portions 91 in the right heating section 76b is connected at the rear end thereof to the second lead 79b.

The straight segments 78 are separated from each other in the longitudinal direction (front-rear direction) of the sensor element 101. The lengthwise direction of the straight segments 78 is parallel to the short-length direction (left-right direction) of the sensor element 101. In this embodiment, the straight segments 78 are arranged such that the lengthwise direction thereof is oriented parallel to the left-right direction. The lengthwise direction of the straight segments 78 is defined as the axial direction of the straight segments 78, i.e., the direction in which a current flows. This is also the case for the lengthwise direction of the bend portions 91.

The turns in the left-right direction in the heating section 76 have varying pitches. Based on the difference in pitch, the heating section 76 is divided into, in sequence from front to rear, first to fourth areas 90a to 90d. The turns in the left-right direction in the first to fourth areas 90a to 90d have pitches P1 to P4, respectively. The pitch of the turns refers to the period of the turns, which is equal to the sum of the line width of the heating section 76 in the front-rear direction (in this embodiment, the line width of the straight segments 78) and the spacing (distance) between the portions of the heating section 76 that are adjacent to each other in the front-rear direction (in this embodiment, the straight segments 78). In this embodiment, P1=P3<P2=P4. Thus, the heating section 76 has, in the front-rear direction, areas 88

(first and third areas 90a and 90c) where the turns have a narrower pitch and areas 89 (second and fourth areas 90b and 90d) where the turns have a wider pitch. The first area 90a and the third area 90c have the same line width and the same spacing between the straight segments 78 in the front-rear direction. The second area 90b and the fourth area 90d have the same line width and the same spacing between the straight segments 78 in the front-rear direction. Whereas the line width changes at the connections (boundaries) between the first to fourth areas 90a to 90d, the line width is constant at other portions within the same area. For example, at the bend portions 91a and 91d extending between the first area 90a and the second area 90b, the line width becomes gradually larger (i.e., wider) from the first area 90a toward the second area 90b. Similarly, the bend portions 91b and 91e extending between the second area 90b and the third area 90c and the bend portions 91c and 91f extending between the third area 90c and the fourth area 90d are shaped such that the line width changes gradually.

Thus, one or more narrower-pitch areas 88 and one or more wider-pitch areas 89 are provided in the heating section 76 in the front-rear direction to adjust the temperature distribution of the sensor element 101 in the front-rear direction during heating. In this embodiment, a comparison between the average temperatures around the first to fourth areas 90a to 90d (i.e., in the portions of the layers 1 to 6 above and below the areas 90a to 90d) in the front-rear direction shows that the temperature is highest around the first area 90a and decreases in the following order: the second area 90b, the third area 90c, and the fourth area 90d. The temperature basically tends to be higher around an area where the turns have a narrower pitch; however, in this embodiment, the temperature around the third area 90c is slightly lower than the temperature around the second area 90b. This is because, for example, the third area 90c occupies a smaller area (shorter in the front-rear direction) than the first area 90a, and the portion around the second area 90b is also heated by the first area 90a. During the heating of the heating section 76, of the narrower-pitch areas 88, the first area 90a reaches a higher temperature (average temperature) than the third area 90c, and the first area 90a reaches the maximum temperature (average temperature) in the heating section 76; thus, the first area 90a is referred to as "maximum-temperature area". It is determined which of the narrower-pitch areas 88 (the first area 90a or the third area 90c) is the maximum-temperature area based on the average temperature of each area after the average temperature of the entire heating section 76 is adjusted from 700° C. to 900° C.

The positions of the narrower-pitch areas 88 and the wider-pitch areas 89 of the heating section 76 are adjusted relative to the inner pump electrode 22, the auxiliary pump electrode 51, and the measuring electrode 44, which will be described below. In FIG. 2, an inner-pump-electrode projected area Ap where the inner pump electrode 22 is projected toward the heating section 76 in the thickness direction (downward in this example) is enclosed by a one-dot chain line. Similarly, an inner-auxiliary-pump-electrode projected area Aq where the auxiliary pump electrode 51 is projected toward the heating section 76 and a measuring-electrode projected area Am where the measuring electrode 44 is projected toward the heating section 76 are enclosed by one-dot chain lines. As shown in FIG. 1, the ceiling electrode portion 51a of the auxiliary pump electrode 51 is located over the measuring electrode 44; therefore, the inner-auxiliary-pump-electrode projected area Aq and the measuring-electrode projected area Am in FIG. 2 overlap each other. More specifically, the measuring-electrode projected area Am is located within the inner-auxiliary-pump-electrode projected area Aq. As can be seen from FIG. 2, the first region 90a, which is one of the narrower-pitch areas 88, is positioned to at least partially overlap the inner-pump-electrode projected area Ap. In other words, at least part of the first area 90a is positioned opposite the inner pump electrode 22 in the top-bottom direction (i.e., located under the inner pump electrode 22). In this embodiment, the inner-pump-electrode projected area Ap is located within the first area 90a. The second area 90b, which is one of the wider-pitch areas 89, is positioned to overlap the inner-auxiliary-pump-electrode projected area Aq. The portion of the inner-auxiliary-pump-electrode projected area Aq forward of the measuring-electrode projected area Am is located within the second area 90b. The third area 90c, which is one of the narrower-pitch areas 88, is positioned to at least partially overlap the measuring-electrode projected area Am. In this embodiment, the measuring-electrode projected area Am and the third area 90c overlap each other such that the measuring-electrode projected area Am extends forwardly and rearwardly of the third area 90c.

In this way, the positions of the narrower-pitch areas 88 and the wider-pitch areas 89 are adjusted relative to the inner pump electrode 22, the auxiliary pump electrode 51, and the measuring electrode 44 to adjust the temperature distribution of and around each electrode. As described above, during the heating of the heating section 76, the temperature is highest around the first area 90a and decreases in the following order: the second area 90b, the third area 90c, and the fourth area 90d. Hence, the relationship temperature Tp> temperature Tq> temperature Tm is satisfied, where the temperature Tp [° C.] is the temperature of the inner pump electrode 22, the temperature Tq [° C.] is the temperature of the auxiliary pump electrode 51, and the temperature Tm [° C.] is the temperature of the measuring electrode 44. Although the temperature Tm is lower than the temperature Tq, they differ only slightly since the measuring-electrode projected area Am overlaps the third area 90c, which is one of the narrower-pitch areas 88, so that the temperature Tm is not too low. The pitches of the turns in the narrower-pitch areas 88 and the wider-pitch areas 89 may be set to achieve the desired temperatures Tp, Tq, and Tm during the heating of the heating section 76. The pitches P1 and P3 of the narrower-pitch areas 88 are, for example, but not limited to, 0.4 to 0.7 mm. The pitches P2 and P4 of the wider-pitch areas 89 are, for example, but not limited to, 0.7 to 0.9 mm.

The distance X1 [mm] between first bend portions 95 present in the maximum-temperature area (first area 90a) among the narrower-pitch areas 88 of the heating section 76 is larger than the distance X2 [mm] between second bend portions 96 present in the wider-pitch areas 89. The first bend portions 95 are the bend portions 91 (turns) present in the maximum-temperature area (first area 90a) and having apexes facing each other in the left-right direction. That is, the first bend portions 95 are the following four bend portions 91: first bend portions 95a and 95c facing each other in the first area 90a and first bend portions 95b and 95d facing each other in the first area 90a. The second bend portions 96 are the bend portions 91 (turns) present in the wider-pitch areas 89 and having apexes facing each other in the left-right direction. That is, the second bend portions 96 are the following six bend portions 91: second bend portions 96a and 96d facing each other in the second area 90b, second bend portions 96b and 96e facing each other in the fourth area 90d, and second bend portions 96c and 96f facing each other in the fourth area 90d. The bend portions 91 extending between the narrower-pitch areas 88 and the wider-pitch areas 89 (overlapping both the narrower-pitch areas 88 and the wider-pitch areas 89) are excluded from the first bend portions 95 or the second bend portions 96. Specifically, the bend portions 91a and 91d extending between the first and second areas 90a and 90b, the bend portions 91b and 91e extending between the second and third areas 90b and 90c, and the bend portions 91c and 91f extending between the third and fourth areas 90c and 90d are excluded from the first bend portions 95 or the second bend portions 96. In this embodiment, the distance between the first bend portions 95a and 95c and the distance between the first bend portions 95b and 95d are equal to each other (=distance X1). Similarly, the distance between the second bend portions 96a and 96d, the distance between the second bend portions 96b and 96e, and the second bend portions 96c and 96f are equal to each other (=distance X2). If the distance between the first bend portions 95 facing each other varies, for example, if the distance between the first bend portions 95a and 95c differs from the distance between the first bend portions 95b and 95d, the distance X1 is defined as the average of the distances between the first bend portions 95 facing each other. This is also the case for the distance X2. In this embodiment, the distance between the bend portions 91a to 91f facing each other, which are excluded from the first bend portions 95 or the second bend portions 96, is equal to the distance X2.

As described in detail later, since the distance X1 is larger than the distance X2 (i.e., the ratio X1/X2 is more than 1), the increase in temperature at the first bend portions 95, where the temperature tends to be higher in the first area 90a, can be reduced, which reduces localized heating in the first area 90a. Preferably, the ratio of the distance X1 to the distance X2, X1/X2, is 4/3 (=1.33 . . . ) or more. This further reduces localized heating at the first bend portions 95. The distance X1 may be more than 0.3 mm, preferably 0.4 mm or more. A distance X1 of 0.4 mm or more further reduces localized heating at the first bend portions 95. The upper limits of the ratio X1/X2 and the distance X1 may be experimentally determined, for example, as a level at which insufficient heating does not occur around the inner pump electrode 22 due to an excessive decrease in the average temperature of the first area 90a, or as a level at which the average temperature of the first area 90a is not lower than or equal to those of the second to fourth areas 90b to 90d. The ratio X1/X2 may be, but not limited to, less than 10/3 (=3.33 . . . ). The distance X1 may be less than 1.0 mm. The distance X2 is, for example, 0.2 to 0.4 mm.

In this embodiment, the heating section 76 is made of a cermet containing a noble metal and a ceramic (e.g., a cermet of platinum (Pt) and alumina ($Al_2O_3$)). The heating section 76, however, need not be made of a cermet, but may be made of any material containing a conductor such as a noble metal. The noble metal used in the heating section 76 may be, for example, at least one of platinum, rhodium (Rh), gold (Au), and palladium (Pd) or an alloy thereof.

The leads 79 include a first lead 79a disposed on the left rear side of the heating section 76 and a second lead 79b disposed on the right rear side of the heating section 76. The first and second leads 79a and 79b are intended to supply a current to the heating section 76 and are connected to the heater connector electrodes 71. The first lead 79a is a positive lead, whereas the second lead 79b is a negative lead. A voltage applied between the first and second leads 79a and 79b causes a current to flow through the heating section 76 so that the heating section 76 generates heat.

A process of manufacturing the thus-configured gas sensor 100 will now be described. This process begins by providing six unfired ceramic green sheets containing an oxygen-ion-conductive solid electrolyte such as zirconia as a ceramic component. These green sheets have, for example, sheet holes for alignment during printing and stacking and necessary through-holes formed in advance. The green sheet for the spacer layer 5 also has a space serving as the gas channel formed in advance, for example, by punching. Pattern printing and drying are then performed to form various patterns on the ceramic green sheets corresponding to the first substrate layer 1, the second substrate layer 2, the third substrate layer 3, the first solid electrolyte layer 4, the spacer layer 5, and the second solid electrolyte layer 6. The specific patterns to be formed are, for example, the patterns of the electrodes described above and the leads connected thereto, the air introduction layer 48, and the heater 72. Pattern printing is performed by applying pastes for pattern formation that are provided depending on the required characteristics of the components to be formed to the green sheets by a known screen printing technique. The paste used for forming the pattern of the heater 72 is a mixture of a raw material containing the constituents of the heater 72 described above (e.g., a noble metal and ceramic particles) with other ingredients such as an organic binder and an organic solvent.

After the various patterns are formed, the green sheets are dried. Drying is performed by a known drying technique. After pattern printing and drying are completed, a bonding paste for stacking and bonding the green sheets corresponding to the individual layers is printed and dried. The green sheets having the bonding paste printed thereon are stacked in a predetermined order while being aligned using the sheet holes and are pressed at a predetermined temperature and pressure to form a multilayer structure. The resulting multilayer structure, which includes a plurality of sensor elements 101, is cut to the size of the sensor element 101. The cut multilayer structures are fired at a predetermined firing temperature to obtain sensor elements 101. The resulting sensor elements 101 are built into sensor assemblies, and other components such as protective covers are attached to obtain gas sensors 100.

During the use of the thus-configured gas sensor 100, the heater 72 is connected to a power supply (e.g., an automotive alternator) via the heater connector electrodes 71, and a DC voltage (e.g., 12 to 14 V) is applied between the first lead 79a and the second lead 79b. The applied voltage causes a current to flow through the heating section 76, which then generates heat. Thus, the temperature of the entire sensor element 101 is adjusted to a temperature at which the solid electrolyte (layers 1 to 6) activates (e.g., 700° C. to 900° C.). Since the turns in the heating section 76 are adjusted to varying pitches, the temperatures of the electrodes described above satisfy the relationship temperature Tp> temperature Tq> temperature Tm. The oxygen concentration is higher around the inner pump electrode 22 since the analyte gas whose oxygen concentration has yet to be adjusted by the main pump cell 21 flows through the gas inlet 10 into the first internal cavity 20. Accordingly, the temperature Tp is made higher than the temperatures Tq and Tm to facilitate the activation of the inner pump electrode 22 and the surrounding solid electrolyte layers so that the main pump cell 21 can pump a larger amount of oxygen. The oxygen concentrations around the auxiliary pump electrode 51 and the measuring electrode 44 are lower than that around the inner pump electrode 22. This may result in, for example, the generation of hydrogen and carbon monoxide from the reduction of water and carbon dioxide in the analyte gas. These components may react chemically with oxygen in NO$_x$ and may thus decrease the measurement accuracy. Such components other than the particular gas (NO$_x$) are more readily reduced at a higher temperature. Accordingly, the temperatures Tq and Tm are made lower than the temperature Tp to reduce the decrease in measurement accuracy.

Figure 3:
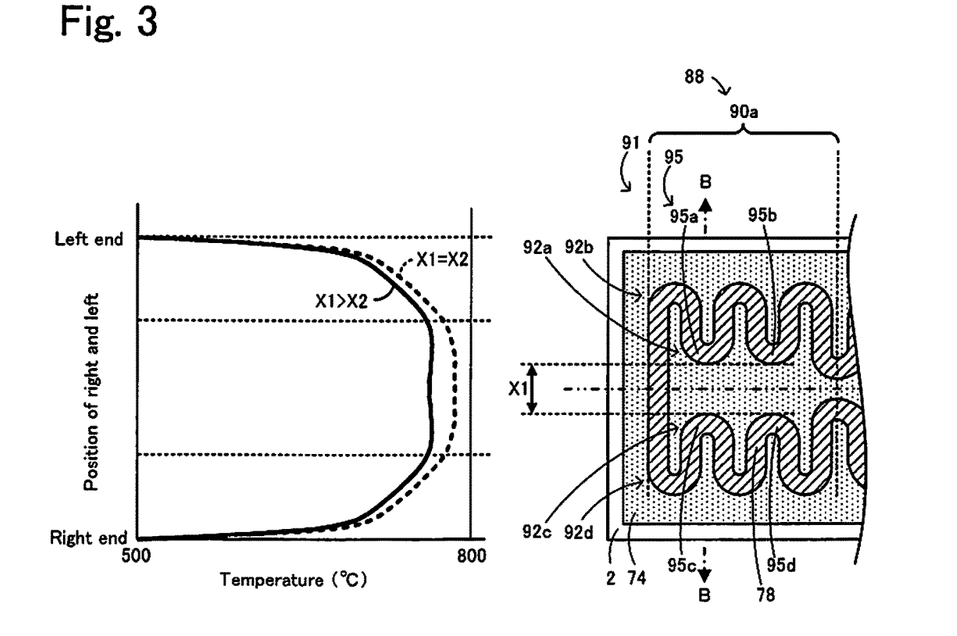
FIG. 3 is a conceptual diagram showing the temperature distribution in and around a maximum-temperature area (first area 90a) of a heating section 76 in the left-right direction.

Thus, the narrower-pitch areas 88 and the wider-pitch areas 89 (first to fourth areas 90a to 90d) are provided in the heater unit 70 according to this embodiment to deliberately create a temperature distribution in the front-rear direction of the sensor element 101. However, a temperature distribution may also occur in each of the first to fourth areas 90a to 90d. For example, the temperature of the heating section 76 generally tends to be higher at the left inner bend portions 92a and the right inner bend portions 92c than at the left outer bend portions 92b and the right outer bend portions 92d. This is because, for example, heat transfer occurs between the left inner bend portions 92a and the right inner bend portions 92c, which face each other, and the left inner bend portions 92a and the right inner bend portions 92c are located inwardly of the left outer bend portions 92b and the right outer bend portions 92d in the left-right direction of the sensor element 101. Therefore, of the left inner bend portions 92a and the right inner bend portions 92c, the temperature generally tends to be locally higher at the first bend portions 95 in the maximum-temperature area (first area 90a). However, since the distance X1 is larger than the distance X2 in the heater unit 70 according to this embodiment, the temperature at the first bend portions 95 facing each other tends to be lower than otherwise due to reduced heat transfer between the first bend portions 95. This reduces localized heating in the first area 90a of the heating section 76. FIG. 3 is a conceptual diagram showing the temperature distribution in and around the maximum-temperature area (first area 90a) of the heating section 76 in the left-right direction. The right side of FIG. 3 illustrates the first area 90a and the surrounding area in FIG. 2. The left side of FIG. 3 is a graph showing the temperature distribution in the top surface of the third substrate layer 3 (see FIG. 1) along line B-B in the right side of FIG. 3. As shown in the graph in FIG. 3, if the distance X1 is equal to the distance X2 (the thick dashed line in the graph), the temperature tends to be higher at and around the first bend portions 95, i.e., in the center of the sensor element 101 in the left-right direction, due to localized heating. If the distance X1 is larger than the distance X2 (the thick solid line in the graph), as in this embodiment, the decrease in temperature is larger at and around the first bend portions 95 than at other portions, which reduces localized heating.

The conductor that forms the heater 72 may be broken when degraded, for example, by oxidation at high temperature. Thus, the heater 72 may be readily broken if it is locally heated and degraded faster at the first bend portions 95 than at other portions. Such locally heated portions are more readily degraded since degraded portions have a higher resistance and thus reach a higher temperature. In the heater unit 70 according to this embodiment, the degradation of the first bend portions 95 can be reduced by reducing localized heating at the first bend portions 95, thus prolonging the life of the entire heater 72.

The correspondences between the elements of this embodiment and the elements of the present invention are shown below. The heater unit 70 according to this embodiment corresponds to a ceramic heater according to the present invention. The first substrate layer 1, the second substrate layer 2, and the third substrate layer 3 correspond to a ceramic substrate. The heater 72 corresponds to a heating element. The narrower-pitch areas 88 correspond to narrower-pitch areas. The wider-pitch areas 89 correspond to wider-pitch areas. The first area 90a corresponds to a maximum-temperature area. The first bend portions 95 correspond to first bend portions. The second bend portions 96 correspond to second bend portions. The first solid electrolyte layer 4, the spacer layer 5, and the second solid electrolyte layer 6 correspond to a multilayer structure. The inner pump electrode 22 corresponds to an inner pump electrode. The outer pump electrode 23 corresponds to an outer pump electrode, an outer measuring electrode, and an outer auxiliary pump electrode. The measuring electrode 44 corresponds to an inner measuring electrode. The auxiliary pump electrode 51 corresponds to an inner auxiliary pump electrode.

In the gas sensor 100 according to the illustrated embodiment, the distance X1 between the first bend portions 95 facing each other in the heater unit 70 is larger than the distance X2 [mm] between the second bend portions 96 facing each other. Thus, the temperature at the first bend portions 95 tends to be lower than otherwise, which reduces localized heating in the maximum-temperature area (first area 90a) of the heater 72. A ratio X1/X2 of 4/3 (=1.33 . . . ) or more further reduces localized heating at the first bend portions 95. A distance X1 of 0.4 mm or more further reduces localized heating at the first bend portions 95.

The sensor element 101 includes the heater unit 70 and detects the concentration of a particular gas in an analyte gas. The sensor element 101 further includes the multilayer structure of oxygen-ion-conductive solid electrolyte layers (layers 4 to 6) on the ceramic substrate (first to third substrate layers 1 to 3) in the thickness direction perpendicular to the longitudinal direction and the short-length direction, the multilayer structure having therein the gas channel into which the analyte gas is externally introduced; and the inner pump electrode 22 (inner main pump electrode) disposed on the inner periphery of the gas channel. The maximum-temperature area (first area 90a) of the heater 72 at least partially overlaps the inner-pump-electrode projected area Ap where the inner pump electrode 22 is projected toward the heater 72 in the thickness direction. This allows the inner pump electrode 22 and the surrounding solid electrolyte layers to be activated at a relatively high temperature by the maximum-temperature area (first area 90a) of the heater 72. The sensor element 101 includes the outer pump electrode 23 disposed on the outer surface of the multilayer structure. The sensor element 101 includes the inner measuring electrode (measuring electrode 44) disposed on the inner periphery of the gas channel downstream of the inner pump electrode 22 in the flow direction of the analyte gas. The sensor element 101 includes the outer measuring electrode (outer pump electrode 23) disposed on the outer surface of the multilayer structure. The sensor element 101 includes the inner auxiliary pump electrode (auxiliary pump electrode 51) disposed on the inner periphery of the gas channel downstream of the inner pump electrode 22 and upstream of the measuring electrode 44 in the flow direction of the analyte gas. The sensor element 101 includes the outer auxiliary pump electrode (outer pump electrode 23) disposed on the outer surface of the multilayer structure. The gas sensor 100 includes the sensor element 101.

The present invention is by no means limited to the embodiments described above, and can be carried out in various ways within the technical scope of the present invention.

Figure 4:
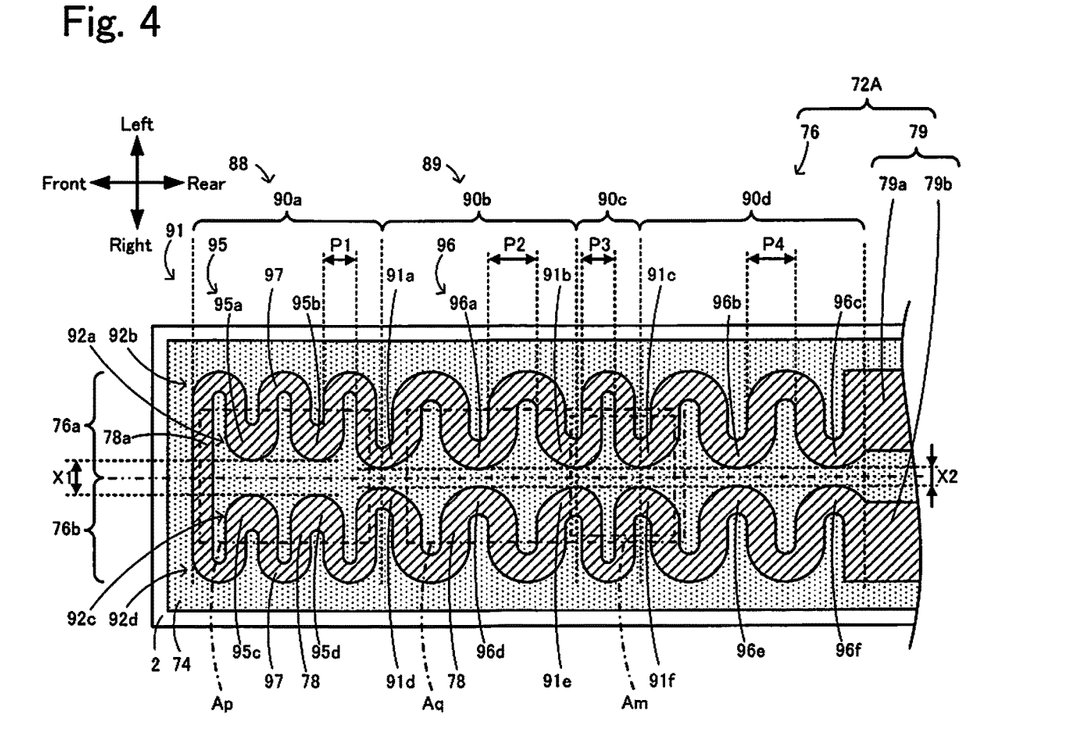
FIG. 4 is an illustration of a heater 72A according to a modification.

For example, the line width in the first to fourth areas 90a to 90d in the illustrated embodiment is constant within the same area (excluding the connections therebetween), and the resistance per unit length is also constant within the same area; however, they need not be constant. FIG. 4 is an illustration of a heater 72A according to a modification. The heater 72A according to this modification has the same configuration as the heater 72 in FIG. 2 except that the resistance per unit length differs at the first bend portions 95 since the width Wa1 [mm] of the first bend portions 95 is larger than the width Wa3 [mm] of third bend portions 97. The third bend portions 97 are the bend portions 91 present in the maximum-temperature area (first area 90a) outwardly of the first bend portions 95 in the short-length direction (left-right direction). In FIG. 4, of the left outer bend portions 92b, the three bend portions 91 present in the first area 90a correspond to the third bend portions 97, and of the right outer bend portions 92d, the three bend portions 91 present in the first area 90a correspond to the third bend portions 97. The third bend portions 97 also include any bend 91 extending between the maximum-temperature area (first area 90a) and another area and present outwardly of the first bend portions 95 in the short-length direction (left-right direction). In the heater 72A according to this modification, the unit resistance Ra1 [μΩ/mm] that is the resistance of the first bend portions 95 per unit length is lower than the unit resistance Ra3 [μΩ/mm] that is the resistance of the third bend portions 97 per unit length at least one temperature in a temperature range from 700° C. to 900° C. In other words, the unit resistance ratio Ra1/Ra3 is less than 1 at least one temperature in the above temperature range. This allows the heat density (amount of heat generated per unit length) to be lower at the first bend portions 95 than at the third bend portions 97 at least one temperature in a temperature range from 700° C. to 900° C. The temperature in the maximum-temperature area (first area 90a) tends to be higher at the first bend portions 95 than at the third bend portions 97 since the first bend portions 95 are located inwardly of the third bend portions 97 in the heater unit 70. By providing a unit resistance Ra1 lower than the unit resistance Ra3 in addition to a distance X1 larger than the distance X2, the increase in temperature at the first bend portions 95, where the temperature tends to be higher, can be further reduced, which further reduces localized heating in the maximum-temperature area (first area 90a) of the heater 72A.

The unit resistance Ra1 is defined as the average resistance of the first bend portions 95 per unit length. Similarly, the unit resistance Ra3 is defined as the average resistance of the third bend portions 97 per unit length. Hence, part of the first bend portions 95 may have a higher resistance per unit length than the third bend portions 97 as long as the first bend portions 95 have a lower resistance per unit length as a whole than the third bend portions 97. Preferably, the resistance per unit length of any portion of any first bend 95 is lower than the unit resistance Ra3. The heating section 76 preferably has a unit resistance ratio Ra1/Ra3 of less than 1 at any temperature in the above temperature range. The heating section 76 preferably has a unit resistance ratio Ra1/Ra3 of 0.87 or less, more preferably 0.80 or less, at least one temperature in the above temperature range. The heating section 76 may have a unit resistance ratio Rat/Ra3 of 0.5 or more at any temperature in the above temperature range. To achieve a unit resistance ratio Ra1/Ra3 of less than 1, the width Wa1 of the first bend portions 95 in the strip-shaped heater 72A in FIG. 4 is made larger (thicker) than the width Wa3 of the third bend portions 97 so that the cross-sectional area Sa1 [mm²] of the first bend portions 95 is larger than the cross-sectional area Sa3 [mm²] of the third bend portions 97 (i.e., the cross-sectional area ratio Sa3/Sa1 is less than 1).

The cross-sectional areas Sa1 and Sa3 are the cross-sectional areas perpendicular to the lengthwise directions of the first bend portions 95 and the third bend portions 97, respectively. The cross-sectional area ratio Sa3/Sa1 can be adjusted to achieve a unit resistance ratio Ra1/Ra3 of less than 1 at any temperature in a temperature range from 700° C. to 900° C. The cross-sectional area ratio Sa3/Sa1 is preferably 0.87 or less, more preferably 0.80 or less. Although the cross-sectional area ratio Sa3/Sa1 of the heater 72A in FIG. 4 is adjusted by providing a width Wa1 larger than the width Wa3, it may be adjusted by providing at least one of a width Wa1 larger than the width Wa3 and a thickness Da1 of the first bend portions 95 larger than the thickness Da3 of the third bend portions 97. As with the unit resistances Ra1 and Ra3, the cross-sectional areas Sa1 and Sa3 are defined as the average cross-sectional areas of the first bend portions 95 and the third bend portions 97, respectively. The third bend portions 97 in the heater 72A in FIG. 4 have the same cross-sectional area (=cross-sectional area Sa3) at any position. The first bend portions 95 are shaped to have the same cross-sectional area as the straight segments 78 (and the third bend portions 97) at the connections to the straight segments 78 and to have a larger cross-sectional area (in this example, a larger width Wa1) at a position farther away from the straight segments 78. That is, the first bend portions 95 are shaped to have the largest cross-sectional area in the center in the front-rear direction (e.g., at the portions of the first bend portions 95a and 95b protruding most rightward). Steps may be formed at the connections between the first bend portions 95 and the straight segments 78 so that the first bend portions 95 have the same cross-sectional area at any position (=cross-sectional area Sa1). The cross-sectional area ratio Sa3/Sa1 may be 0.5 or more. The widths Wa1 and Wa3 may be 0.05 to 1.5 mm. The thicknesses Da1 and Da3 may be 0.003 to 0.1 mm.

Although the heater 72A in FIG. 4 has a cross-sectional area ratio Sa3/Sa1 of less than 1, the volume resistivities of the first bend portions 95 and the third bend portions 97 may instead be adjusted to achieve a unit resistance ratio Ra1/Ra3 of less than 1. For example, the ratio of the volume resistivity ρa1 [μΩ·cm] of the first bend portions 95 to the volume resistivity ρa3 [μΩ·cm] of the third bend portions 97, i.e., the volume resistivity ratio ρa1/ρa3, may be less than 1 at least one temperature in a temperature range from 700° C. to 900° C. This allows for a unit resistance ratio Ra1/Ra3 of less than 1 at least one temperature in the above temperature range. Preferably, the volume resistivity ratio ρa1/ρa3 is 0.87 or less, more preferably 0.80 or less, at least one temperature in the above temperature range. For example, the first bend portions 95 may contain a larger amount of noble metal (conductor) than the third bend portions 97 so that the volume resistivity ρa1 is lower than the volume resistivity ρa3. Alternatively, for example, the third bend portions 97 may contain platinum as a major component, and the first bend portions 95 may contain a noble metal having a lower volume resistivity than platinum (e.g., rhodium or gold) in addition to or instead of platinum so that the volume resistivity ρa1 is lower than the volume resistivity ρa3. That is, the first bend portions 95 may contain a noble metal that is not present in the third bend portions 97 and that has a lower volume resistivity than the noble metal present in the third bend portions 97. Alternatively, the first bend portions 95 may contain a material having a lower temperature coefficient of resistance (expressed in %/° C.) than the noble metal serving as a major component in a larger amount than the third bend portions 97 so that the volume resistivity ρa1 is lower than the volume resistivity ρa3 at least one temperature in the above temperature range. Examples of such materials having low temperature coefficients of resistance include nichrome (alloys containing nickel (Ni) and chrome (Cr)), Kanthal (registered trademark for alloys containing iron, chromium, and aluminum), and molybdenum disilicide ($MoSi_2$). As with the unit resistances Ra1 and Ra3, the volume resistivities ρa1 and ρa3 are defined as the average volume resistivities of the first bend portions 95 and the third bend portions 97, respectively. The volume resistivity ratio ρa1/ρa3 may be 0.5 or more at any temperature in the above temperature range.

The heater 72A in FIG. 4 may have both a cross-sectional area ratio Sa3/Sa1 of less than 1 and a volume resistivity ratio ρa1/ρa3 of less than 1. For example, the product of the cross-sectional area ratio Sa3/Sa1 and the volume resistivity ratio ρa1/ρa3 (=unit resistance ratio Ra1/Ra3) may be less than 1, 0.87 or less, or 0.80 or less at least one temperature in the above temperature range. If the heater 72A has a cross-sectional area ratio Sa3/Sa1 of less than 1, the first bend portions 95 and the third bend portions 97 may be made of the same material or different materials. As with the relationship between the unit resistance Ra1 and the unit resistance Ra3, the unit resistance Ra1 may be lower than the unit resistance Ra4 [μΩ/mm] that is the resistance per unit length of the straight segments 78 present in the maximum-temperature area (first area 90a) and closest to the first bend portions 95 (in FIG. 4, the eight straight segments 78). The straight segments 78 closest to the first bend portions 95 are those directly connected to the first bend portions 95. If at least one of the unit resistance ratio Ra1/Ra3 and the unit resistance ratio Ra1/Ra4 is less than 1, the distance X1 need not be larger than the distance X2 (e.g., the distance X1 may be equal to the distance X2). The increase in temperature at the first bend portions 95, where the temperature tends to be higher, can still be reduced, which provides the effect of reducing localized heating in the maximum-temperature area (first area 90a) of the heater 72A.

Although the positions of the narrower-pitch areas 88 and the wider-pitch areas 89 of the heating section 76 in the illustrated embodiment are adjusted relative to the inner pump electrode 22, the auxiliary pump electrode 51, and the measuring electrode 44 as shown in FIG. 2, they need not be adjusted as shown. Although the illustrated embodiment satisfies the relationship temperature Tp> temperature Tq> temperature Tm, it need not be satisfied. Preferably, the maximum-temperature area (first area 90a) at least partially overlaps the inner-pump-electrode projected area Ap.

The heater 72 of the heater unit 70 need not be of the shape (pattern) used in the illustrated embodiment. For example, a pattern having more or fewer bend portions 91 and straight segments 78 than the pattern shown in FIG. 2 may be used. The heating section 76 only need to have at least two or more first bend portions 95 (one or more pairs of first bend portions 95 facing each other) and two or more second bend portions 96 (one or more pairs of second bend portions 96 facing each other). If the heater 72 has a unit resistance ratio Ra1/Ra3 of less than 1, as described with reference to the heater 72A in FIG. 4, the heating section 76 only need to have one or more third bend portions 97 and may have a plurality of third bend portions 97. The heating section 76 may have no straight segment 78. For example, the frontmost straight segment 78a of the straight segments 78 of the heating section 76 in FIG. 2 may be replaced with a plurality of turns in the front-rear direction. In addition, there may be no straight segment 78 between the left inner bend portions 92a and the left outer bend portions 92b (i.e., the straight segments 78 may have a length of 0 mm). This is also the case for the straight segments 78 between the right inner bend portions 92c and the right outer bend portions 92d. The left heating section 76a may be asymmetrical with the right heating section 76b.

The narrower-pitch areas 88 and the wider-pitch areas 89 (first to fourth areas 90a to 90d) need not be arranged as in the illustrated embodiment. For example, all the areas other than the first area 90a may be wider-pitch areas 89 (e.g., the pitch P3 of the third area 90c may be equal to the pitches P2 and P4). If there is only one narrower-pitch area 88, that area serves as the maximum-temperature area. Although the heating section 76 in the illustrated embodiment has two narrower-pitch areas 88 and two wider-pitch areas 89, it only need to have one or more narrower-pitch areas 88 and one or more wider-pitch areas 89. Although the narrower-pitch areas 88 in the illustrated embodiment have both a smaller line width and a smaller spacing in the front-rear direction than the wider-pitch areas 89, it is only necessary that the turns in the narrower-pitch areas 88 have a narrower pitch (smaller pitch) than those in the wider-pitch areas 89. That is, the narrower-pitch areas 88 only need to have at least one of a smaller line width and a smaller spacing in the front-rear direction than the wider-pitch areas 89.

Although the pitches of the turns in the heating section 76 in the illustrated embodiment satisfy the relationship P1=P3<P2=P4, that is, the turns have only two different pitches in the narrower-pitch areas 88 and the wider-pitch areas 89, they may have three or more different pitches. In this case, it is only necessary that the distance X1 determined based on the maximum-temperature area of (one or more) areas where the turns have the narrowest pitch be larger than the distance X2 determined based on (one or more) areas where the turns have the widest pitch.

In the illustrated embodiment, the distance X1 may be larger than the distance X2' [mm] between the bend portions 91, other than the first bend portions 95, having apexes facing each other in the short-length direction. The distance X2' is calculated by the same procedure as the distance X2 except that the distance X2' is directed to all bend portions 91, other than the first bend portions 95, having apexes facing each other in the short-length direction. For example, the distance X2' of the heater 72 in FIG. 2 is calculated as the distance between the bend portions 91a to 91f facing each other in the short-length direction and between the second bend portions 96a to 96f facing each other in the short-length direction. As described above, the distance between the bend portions 91a to 91f facing each other in FIG. 2 is equal to the distance X2; therefore, in the illustrated embodiment, X1> X2=X2'. As with the ratio X1/X2, the ratio X1/X2' may be 4/3 (=1.33 . . . ) or more and may be less than 10/3 (=3.33 . . . ). The distance X2' may be, for example, 0.2 to 0.4 mm.

In the illustrated embodiment, the distance X1' [mm] between the turns present in the narrower-pitch areas 88 and having apexes facing each other in the short-length direction may be larger than the distance X2. The distance X1' is calculated by the same procedure as the distance X1 except that the distance X1' is directed to all narrower-pitch areas 88, irrespective of whether they are the maximum-temperature area or not. For the heater 72 shown in FIG. 2, X1=X1'> X2 since the third area 90c has only the bend portions 91b, 91c, 91e, and 91f extending between the narrower-pitch areas 88 and the wider-pitch areas 89. For example, if the third area 90c has more turns, turns 91 not extending between the narrower-pitch areas 88 and the wider-pitch areas 89 and having apexes facing each other in the short-length direction can be present in the third area 90c. In this case, the distance X1' is determined by taking into account the distance between these bend portions 91; therefore, it may differ from the distance X1 for certain heaters. In such cases, satisfying the relationship X1'>X2 reduces localized heating in the narrower-pitch areas of the heating element. The relationship X1'> X2 may be satisfied irrespective of whether the relationship X1> X2 is satisfied or not. This provides the effect of reducing localized heating in the narrower-pitch areas of the heating element. Nevertheless, it is preferred to satisfy the relationship X1> X2 since the temperature tends to be higher at the first bend portions 95 in the maximum-temperature area among the bend portions 91 present in the narrower-pitch areas 88 and having apexes facing each other in the short-length direction. As with the ratio X1/X2, the ratio X1'/X2 may be 4/3 (=1.33 . . . ) or more and may be less than 10/3 (=3.33 . . . ). The distance X1' may be more than 0.3 mm and may be 0.4 mm or more. The distance X1' may be less than 1.0 mm.

Although the first bend portions 95a and 95c in the illustrated embodiment face each other at the same position in the front-rear direction (i.e., the straight line connecting the apexes of the turns is parallel to the left-right direction), they need not face each other at the same position. Rather, the first bend portions 95a and 95c may face each other at different positions in the front-rear direction. This is also the case for the positions of the first bend portions 95b and 95d relative to each other. In such cases, first bend portions 95 facing each other at the minimum distance are paired together, and the distance X1 is defined as the average of the distances (minimum distances) between the first bend portions 95 facing each other of one or more such pairs. For example, it is supposed that the first bend portions 95a, 95c, 95b, and 95d are staggered in that order from front to rear. In this case, if the distance between the first bend portions 95a and 95c is smaller than the distance between the first bend portions 95b and 95c, the first bend portions 95a and 95c are paired together, and the first bend portions 95b and 95d are paired together. The distance X1 is therefore defined as the average of the distance between the first bend portions 95a and 95c and the distance between the first bend portions 95b and 95d. If the distance between the first bend portions 95b and 95c is smaller than the distance between the first bend portions 95a and 95c, the first bend portions 95b and 95c are paired together. The distance X1 is therefore defined as the distance between the first bend portions 95b and 95c. This is also the case for the distance X2.

Although the lengthwise direction of the straight segments 78 in the illustrated embodiment is parallel to the short-length direction (left-right direction) of the heater unit 70, they need not be exactly parallel to each other as long as they point in similar directions. For example, the lengthwise direction of the straight segments 78 may be inclined (at an angle of less than 45°) with respect to the short-length direction.

Although the heater 72 in the illustrated embodiment is strip-shaped, it need not be strip-shaped, but may instead be wire-shaped (e.g., circular or oval in cross-section).

Although the heater unit 70 according to the illustrated embodiment has been described as being incorporated in the gas sensor 100, it is possible in accordance with the invention to use the sensor element 101 alone or to use the heater unit 70 alone, i.e., a ceramic heater alone. Although the heater unit 70 includes the first substrate layer 1, the second substrate layer 2, and the third substrate layer 3, it may include any ceramic substrate surrounding the heater 72. For example, there may be only one layer below the heater 72, rather than two layers (first substrate layer 1 and the second substrate layer 2). Although the heater unit 70 includes the heater insulating layer 74, it may be omitted if the ceramic substrate surrounding the heater 72 (e.g., the first substrate layer 1 and the second substrate layer 2) is made of an insulating material (e.g., alumina ceramic). The sensor element 101 may have, for example, a length of 25 to 100 mm in the front-rear direction, a width of 2 to 10 mm in the left-right direction, and a thickness of 0.5 to 5 mm in the top-bottom direction.

EXAMPLES

The following examples illustrate the fabrication of specific sensor elements. Experimental Examples 2 to 9 correspond to examples of the present invention, whereas Experimental Example 1 corresponds to a comparative example. It should be noted that the following examples are not intended to limit the invention.

Experimental Examples 1 to 9

Sensor elements 101 shown in FIGS. 1 and 2 were fabricated as Experimental Examples 1 to 9 by the process of manufacturing the gas sensor 100 according to the illustrated embodiment. Experimental Examples 1 to 9 were identical except that the distance X1 (and the ratio X1/X2) varied as shown in Table 1 below. The sensor elements 101 had a length of 67.5 mm in the front-rear direction, a width of 4.25 mm in the left-right direction, and a thickness of 1.45 mm in the top-bottom direction. The heating section 76 had a line width of 0.26 mm in the narrower-pitch areas 88 and a line width of 0.41 mm in the wider-pitch areas 89 (excluding the connections between the narrower-pitch areas 88 and the wider-pitch areas 89). The pitches P1 and P3 of the turns were 0.56 mm. The pitches P2 and P4 of the turns were 0.82 mm. The ceramic green sheets used for the fabrication of the sensor element 101 were formed by mixing zirconia particles doped with 4 mol % yttria as a stabilizer, an organic binder, and an organic solvent and casting the mixture by tape casting. The conductive paste used for the heating section 76 of the heater unit 70 was prepared as follows. A premixture was prepared by premixing 4% by mass alumina particles, 96% by mass Pt, and a predetermined amount of acetone, serving as a solvent. An organic binder solution was then prepared by dissolving 20% by mass polyvinyl butyral in 80% by mass butyl carbitol and was added to and mixed with the premixture. The viscosity was then adjusted by adding an appropriate amount of butyl carbitol to obtain a conductive paste.

[Evaluation Test]

Experimental Examples 1 to 9 were evaluated for the temperature during heating and durability (life) of the heater 72. Specifically, a current was supplied through the heater 72 by applying a voltage to the leads 79 at 12 W. When the temperature of the sensor element 101 became stable at least 3 minutes after starting to apply a voltage, the temperature distribution was measured in the maximum-temperature area (first area 90a). The temperature distribution in the first area 90a was indirectly measured by measuring the temperature in a rectangular area of the bottom surface of the sensor element 101 under the first area 90a with a radiation thermometer. The measurement results were used to calculate the maximum temperature, the average temperature, and the difference between the maximum temperature and the average temperature. For Experimental Examples 1 and 5, the minimum temperature in the first area 90a was also measured. The temperature Tp of the inner pump electrode 22 was also measured while a current was being supplied through the heater 72. Temperatures Tp of 700° C. or higher were rated as good in the electrode temperature evaluation, indicating that the inner pump electrode 22 was sufficiently heated. Temperatures Tp of lower than 700° C. were rated as poor in the electrode temperature evaluation. The temperature Tp was indirectly measured by measuring the temperature in an area of the top surface of the sensor element 101 over the inner pump electrode 22 with a radiation thermometer and calculating the average temperature. The resistances of the heater 72 before and after a current was supplied through the heater 72 for 500 hours were measured and used to calculate the change rate in resistance (increase rate in resistance) [%]. The resistance was measured as the resistance between the heater connector electrodes 71 connected to the first lead 79a and the second lead 79b. Change rates in resistance of less than 3% were rated as good. Change rates in resistance of 3% or more were rated as poor. A portion oxidized at high temperature in the heating section 76 of the heater 72 has a higher resistance; therefore, a larger change rate in resistance indicates more degradation in the heater 72. Since Experimental Examples 1 to 9 are identical except for the distance X1, the differences in the change rate in resistance between Experimental Examples 1 to 9 are attributable to the differences in the degree of degradation at the first bend portions 95 due to the differences in distance X1.

Figure 5:
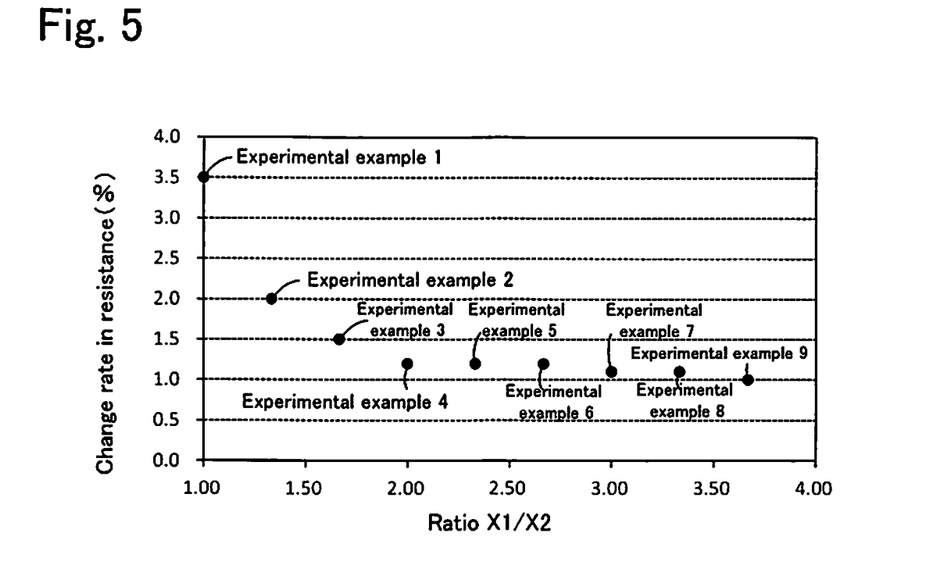
FIG. 5 is a graph showing the relationship between the ratio X1/X2 and the change rate in resistance for Experimental Examples 1 to 9.

Table 1 summarizes the distance X1, the distance X2, the ratio X1/X2, the temperature distribution (the maximum temperature, the average temperature, and the difference between the maximum temperature and the average temperature) in the maximum-temperature area (first area 90a), the evaluation of the electrode temperature, the change rate in resistance, and the evaluation of the change rate in resistance for Experimental Examples 1 to 9. Table 1 also shows the minimum temperature in the maximum-temperature area for Experimental Examples 1 and 5. FIG. 5 is a graph showing the relationship between the ratio X1/X2 and the change rate in resistance for Experimental Examples 1 to 9.

TABLE 1

| | Distance X1 [mm] | Distance X2 [mm] | Ratio X1/X2 | Temperature distribution in maximum-temperature area (first area) [° C.] | | | Difference between Maximum and average | Evaluation of electrode temperature | Change rate in resistance | |
|---|---|---|---|---|---|---|---|---|---|---|
| | | | | Maximum | Average | Minimum | | | Measured value [%] | Evaluation |
| Experimental Example 1 | 0.3 | 0.3 | 1.00 | 804 | 747 | 636 | 57 | Good | 3.5 | Poor |
| Experimental Example 2 | 0.4 | 0.3 | 1.33 | 795 | 746 | — | 49 | Good | 2.0 | Good |
| Experimental Example 3 | 0.5 | 0.3 | 1.67 | 792 | 745 | — | 47 | Good | 1.5 | Good |
| Experimental Example 4 | 0.6 | 0.3 | 2.00 | 790 | 745 | — | 45 | Good | 1.2 | Good |
| Experimental Example 5 | 0.7 | 0.3 | 2.33 | 786 | 743 | 640 | 43 | Good | 1.2 | Good |
| Experimental Example 6 | 0.8 | 0.3 | 2.67 | 780 | 741 | — | 39 | Good | 1.2 | Good |
| Experimental Example 7 | 0.9 | 0.3 | 3.00 | 755 | 720 | — | 35 | Good | 1.1 | Good |
| Experimental Example 8 | 1.0 | 0.3 | 3.33 | 720 | 690 | — | 30 | Poor | 1.1 | Good |
| Experimental Example 9 | 1.1 | 0.3 | 3.67 | 695 | 665 | — | 30 | Poor | 1.0 | Good |

As shown in Table 1, Experimental Examples 2 to 9, where the ratio X1/X2 was more than 1.00, had lower maximum temperatures in the maximum-temperature area (first area 90a) and smaller differences between the maximum temperature and the average temperature than Experimental Example 1, where the ratio X1/X2 was 1.00. A comparison between Experimental Examples 1 and 5 shows that they had nearly the same minimum temperature in the maximum-temperature area. That is, localized heating at the first bend portions 95 in the maximum-temperature area was successfully reduced in Experimental Examples 2 to 9. Experimental Examples 2 to 9 also had smaller change rates in resistance than Experimental Example 1, i.e., less than 3% (good). This demonstrates that a ratio X1/X2 of more than 1 results in a prolonged life of the entire heater 72. The results for Experimental Examples 1 and 2 also demonstrate that a ratio X1/X2 of 4/3 (=1.33 . . . ) or more and a distance X1 of 0.4 mm or more are preferred. The results for Experimental Examples 2 to 9 show that both the maximum temperature and the difference between the maximum temperature and the average temperature in the maximum-temperature area had a tendency to decrease with increasing ratio X1/X2. A similar tendency was observed for volume resistivity. Experimental Examples 2 to 7, where the distance X1 was less than 1.0 mm and the ratio X1/X2 was less than 10/3 (=3.33 . . . ), had sufficiently higher temperatures at the inner pump electrode 22 than Experimental Examples 8 and 9 and were rated as good in the electrode temperature evaluation.

The present application claims priority of Japanese Patent Application No. 2016-015631 filed on Jan. 29, 2016, the entire contents of which are incorporated herein by reference.

What is claimed is:

1. A ceramic heater comprising:
a plate-like ceramic substrate having a longitudinal direction and a short-length direction; and
a heating element disposed in the ceramic substrate, the heating element being routed to make a plurality of turns in the short-length direction and a longitudinal turn at one end in the longitudinal direction, the heating element consisting of, in the longitudinal direction, one or more narrower-pitch areas each being an area where the turns in the short-length direction have a first pitch and one or more wider-pitch areas each being an area where the turns in the short-length direction have a pitch that is greater than the first pitch,
wherein the heating element includes first bend portions, the first bend portions being turns present in a maximum-temperature area that is one area of the one or more narrower-pitch areas where a maximum average temperature of the heating element is reached during heating and having apexes facing each other in the short-length direction, and second bend portions, the second bend portions being turns present in the one or more wider-pitch areas and having apexes facing each other in the short-length direction, an average distance X1 [mm] between the first bend portions facing each other being larger than an average distance X2 [mm] between the second bend portions facing each other,
wherein a distance between each of the first bend portions facing each other is equal or a distance between each of the second bend portions facing each other is equal,
wherein the maximum average temperature in the maximum-temperature area is higher than an average temperature of each of the one or more wider-pitch areas during heating, and
wherein the one or more narrower-pitch areas includes two narrower-pitch areas, the one or more wider-pitch areas includes two wider-pitch areas, and the two narrower-pitch areas alternate with the two wider-pitch areas in the heating element.

2. The ceramic heater according to claim 1, wherein a ratio of the average distance X1 to the average distance X2, X1/X2, is 4/3 or more.

3. The ceramic heater according to claim 1, wherein the average distance X1 is 0.4 mm or more.

4. The ceramic heater according to claim 1, wherein the heating element has a third bend portion present in the maximum-temperature area outwardly of the first bend portions in the short-length direction, and a unit resistance Ra1 [μΩ/mm] that is the resistance of the first bend portions per unit length is lower than a unit resistance Ra3 [μΩ/mm] that is the resistance of the third bend portion per unit length at least one temperature in a temperature range from 700° C. to 900° C.

5. The ceramic heater according to claim 4, wherein the first bend portions have a larger area than the third bend portion in a cross-section perpendicular to a lengthwise direction.

6. The ceramic heater according to claim 5, wherein the heating element is strip-shaped, and
the first bend portions are wider than the third bend portion.

7. The ceramic heater according to claim 1, wherein the distance between each of the first bend portions facing each other is equal.

8. The ceramic heater according to claim 1, wherein the distance between each of the second bend portions facing each other is equal.

9. A sensor element for detecting a concentration of a particular gas in an analyte gas, the sensor element comprising the ceramic heater according to claim 1.

10. The sensor element according to claim 9, further comprising:
a multilayer structure of oxygen-ion-conductive solid electrolyte layers on the ceramic substrate in a thickness direction perpendicular to the longitudinal direction and the short-length direction, the multilayer structure having therein a gas channel into which the analyte gas is externally introduced; and
an inner pump electrode disposed on an inner periphery of the gas channel,
wherein the maximum-temperature area of the heating element at least partially overlaps an inner-pump-electrode projected area where the inner pump electrode is projected toward the heating element in the thickness direction.

11. A gas sensor comprising the sensor element according to claim 9.

* * * * *